(12) United States Patent
Khlat

(10) Patent No.: US 10,381,728 B2
(45) Date of Patent: Aug. 13, 2019

(54) MULTI-BAND RADIO FREQUENCY CIRCUIT

(71) Applicant: Qorvo US, Inc., Greensboro, NC (US)

(72) Inventor: Nadim Khlat, Cugnaux (FR)

(73) Assignee: Qorvo US, Inc., Greensboro, NC (US)

(*) Notice: Subject to any disclaimer, the term of this patent is extended or adjusted under 35 U.S.C. 154(b) by 115 days.

(21) Appl. No.: 15/728,265

(22) Filed: Oct. 9, 2017

(65) Prior Publication Data

US 2018/0191067 A1    Jul. 5, 2018

Related U.S. Application Data

(60) Provisional application No. 62/441,809, filed on Jan. 3, 2017.

(51) Int. Cl.
  *H01Q 5/50* (2015.01)
  *H04B 1/00* (2006.01)
  *H01Q 1/24* (2006.01)

(52) U.S. Cl.
  CPC ............... *H01Q 5/50* (2015.01); *H01Q 1/242* (2013.01); *H04B 1/0064* (2013.01); *H04B 1/0057* (2013.01)

(58) Field of Classification Search
  CPC ........ H01Q 5/50; H01Q 1/242; H01Q 1/0064; H04B 1/0064; H04B 1/0057
  See application file for complete search history.

*Primary Examiner* — Graham P Smith
(74) *Attorney, Agent, or Firm* — Withrow & Terranova, P.L.L.C.

(57) ABSTRACT

Embodiments of the disclosure include a multi-band radio frequency (RF) circuit. The multi-band RF circuit includes antenna swapping circuitry coupled to multiple antenna ports that are coupled to multiple antennas, each capable of receiving and/or transmitting in one or more RF bands. In examples discussed herein, the multi-band RF circuit is configured to support a first RF band in a first frequency spectrum, a second RF band in a second frequency spectrum higher than the first frequency spectrum, a third RF band in a third frequency spectrum higher than the second frequency spectrum, and a fourth frequency band in a fourth frequency spectrum higher than the third frequency spectrum. The multi-band RF circuit includes control circuitry that can control the antenna swapping circuitry to select one or more of the multiple antenna ports to support various frequency band combinations without compromising RF performance of the multi-band RF circuit.

20 Claims, 3 Drawing Sheets

MULTI-BAND RADIO FREQUENCY CIRCUIT

RELATED APPLICATIONS

Figure 1:
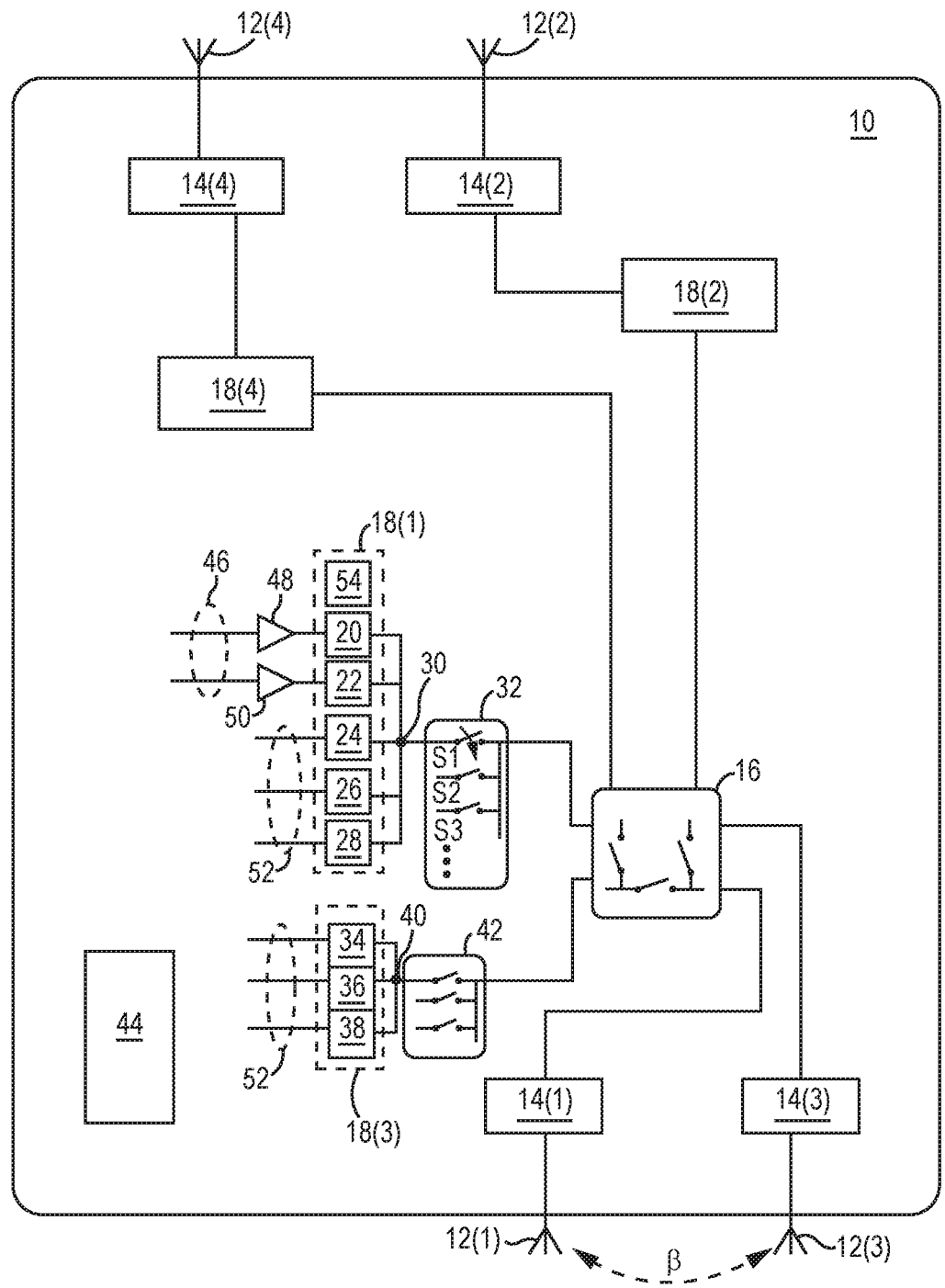

This application claims the benefit of U.S. Provisional Patent Application Ser. No. 62/441,809, filed Jan. 3, 2017, the disclosure of which is hereby incorporated herein by reference in its entirety.

FIELD OF THE DISCLOSURE

The technology of the disclosure relates generally to radio frequency (RF) circuits supporting multiple RF bands.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as long-term evolution (LTE). Particularly in light of carrier aggregation (CA) schemes supported by modern cellular communications networks, a mobile communication device can be configured to simultaneously transmit an outgoing radio frequency (RF) signal(s) in multiple uplink frequency bands, while receiving an incoming RF signal(s) in multiple downlink frequency bands. The uplink and downlink frequency bands supported by a mobile communication device can be generally categorized based on respective frequency spectrums for easy reference. Some of the most commonly referenced frequency band categories include low-band (LB), mid-low-band (MLB), mid-band (MB), and high-band (HB). The LB, the MLB, the MB, and the HB categories typically refer to frequency spectrums between 450-960 MHz, 1452-1496 MHz, 1710-2200 MHz, and 2300-2700 MHz, respectively.

Support for the multiple frequency bands is provided by multiple radio front-ends, each supporting one or more frequency bands. Each radio front-end may be connected to a common antenna via a multiplexer (e.g., a diplexer for the dual-band scenario, a triplexer for a tri-band scenario, a quadplexer for quad-band scenario, or a pentaplexer for a penta-band scenario). Furthermore, the mobile communication device may include multiple antennas, each coupled to one or more multiplexers, to support multiple-input multiple-output (MIMO) and/or RF beamforming operations. In this regard, it may be desired to optimize configurations between the multiple radio front-ends and the multiple antennas to provide flexible band combinations without compromising RF performance of the mobile communication device.

SUMMARY

Embodiments of the disclosure include a multi-band radio frequency (RF) circuit. The multi-band RF circuit includes antenna swapping circuitry coupled to multiple antenna ports that are coupled to multiple antennas, each capable of receiving and/or transmitting in one or more RF bands. In examples discussed herein, the multi-band RF circuit is configured to support a first RF band in a first frequency spectrum, a second RF band in a second frequency spectrum higher than the first frequency spectrum, a third RF band in a third frequency spectrum higher than the second frequency spectrum, and a fourth frequency band in a fourth frequency spectrum higher than the third frequency spectrum. The multi-band RF circuit includes control circuitry that can control the antenna swapping circuitry to select one or more of the multiple antenna ports to support various frequency band combinations in such operation modes as carrier aggregation (CA) and multiple-input multiple-output (MIMO) without compromising RF performance of the multi-band RF circuit.

In one aspect, a multi-band RF circuit is provided. The multi-band RF circuit includes antenna swapping circuitry coupled to at least one first antenna port coupled to at least one first antenna, at least one second antenna port coupled to at least one second antenna, at least one third antenna port coupled to at least one third antenna, and at least one fourth antenna port coupled to at least one fourth antenna. Each of the at least one first antenna, the at least one second antenna, the at least one third antenna, and the at least one fourth antenna is configured to transmit an RF uplink signal and receive an RF downlink signal in a first RF band having a first frequency spectrum, a second RF band having a second frequency spectrum higher than the first frequency spectrum, a third RF band having a third frequency spectrum higher than the second frequency spectrum, and a fourth RF band having a fourth frequency spectrum higher than the third frequency spectrum. The multi-band RF circuit also includes control circuitry coupled to the antenna swapping circuitry. The control circuitry is configured to control the antenna swapping circuitry to select one or more of the at least one first antenna port and the at least one second antenna port to receive the RF downlink signal in the second RF band. The control circuitry is also configured to control the antenna swapping circuitry to select one or more of the at least one third antenna port and the at least one fourth antenna port to transmit the RF uplink signal and receive the RF downlink signal in the third RF band and the fourth RF band.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

Figure 2:
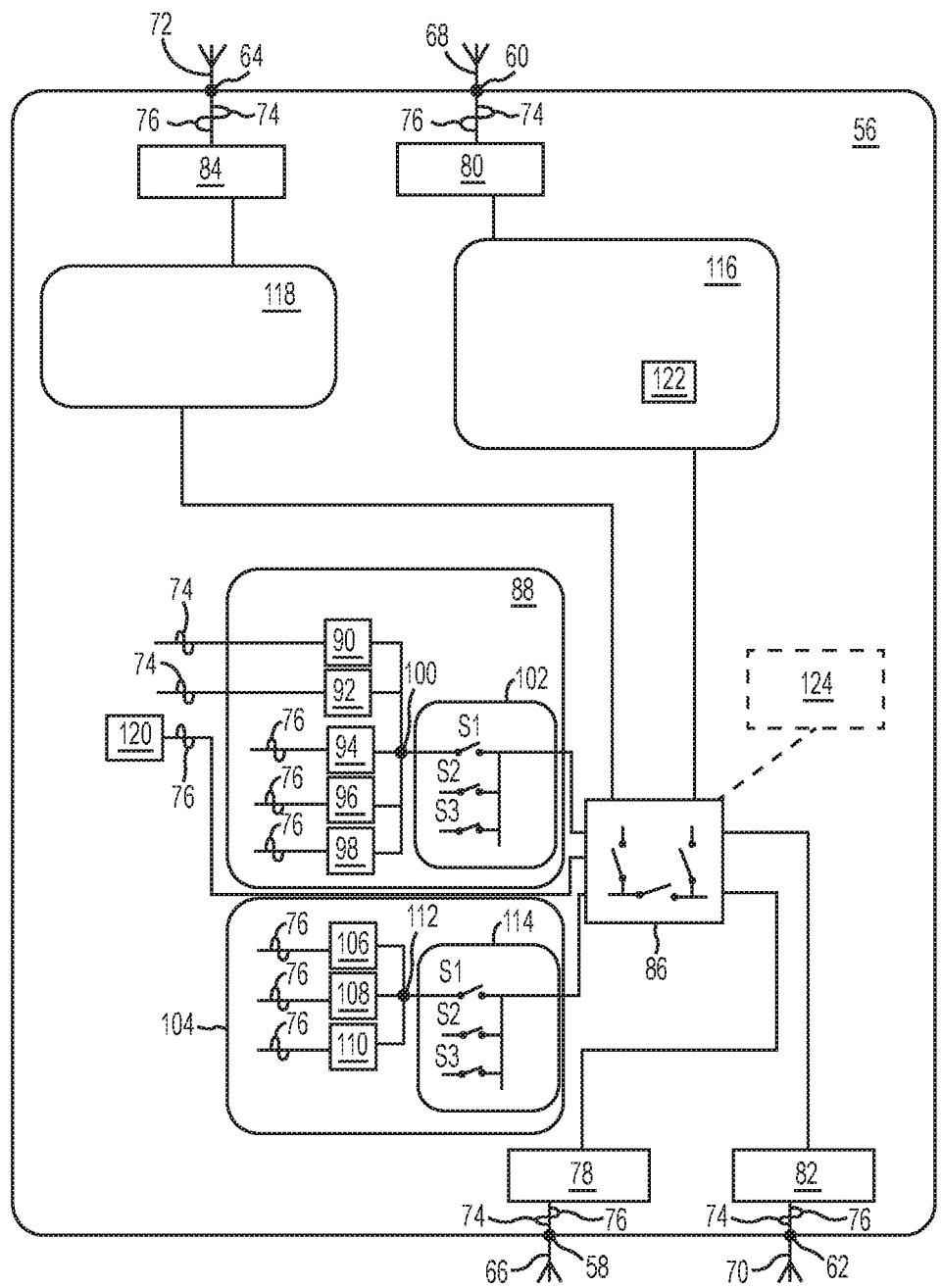
Figure 3:
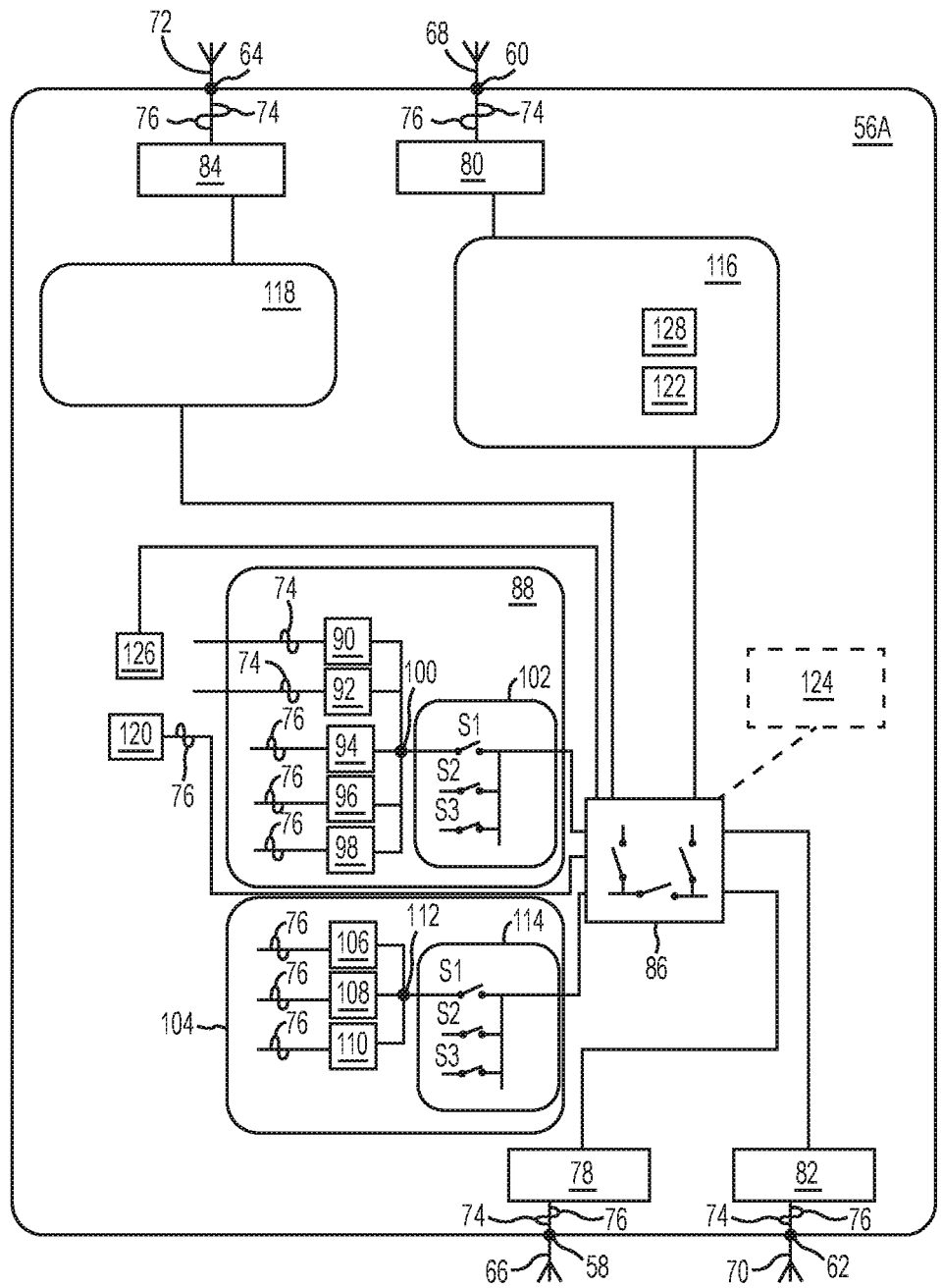

FIG. 1 is a schematic diagram of an exemplary radio frequency (RF) circuit configured according to a conventional band expansion method to support multiple RF bands;

FIG. 2 is a schematic diagram of an exemplary multi-band RF circuit configured to support multiple RF bands based on a band expansion method different from the conventional band expansion method of FIG. 1; and FIG. 3 is a schematic diagram of an exemplary multi-band RF circuit configured to support multiple RF bands based on a configuration method different from the band expansion method of FIG. 2.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure include a multi-band radio frequency (RF) circuit. The multi-band RF circuit includes antenna swapping circuitry coupled to multiple antenna ports that are coupled to multiple antennas, each capable of receiving and/or transmitting in one or more RF bands. In examples discussed herein, the multi-band RF circuit is configured to support a first RF band in a first frequency spectrum, a second RF band in a second frequency spectrum higher than the first frequency spectrum, a third RF band in a third frequency spectrum higher than the second frequency spectrum, and a fourth frequency band in a fourth frequency spectrum higher than the third frequency spectrum. The multi-band RF circuit includes control circuitry that can control the antenna swapping circuitry to select one or more of the multiple antenna ports to support various frequency band combinations in such operation modes as carrier aggregation (CA) and multiple-input multiple-output (MIMO) without compromising RF performance of the multi-band RF circuit.

Before discussing exemplary aspects of a multi-band RF circuit, a brief discussion of an RF circuit configured according to a conventional band expansion method to support multiple RF bands is first provided with reference to FIG. 1. The discussion of specific exemplary aspects of a multi-band RF circuit starts below with reference to FIG. 2.

In this regard, FIG. 1 is a schematic diagram of an exemplary RF circuit 10 configured according to a conventional band expansion method to support multiple RF bands. The RF circuit 10 includes a plurality of antennas 12(1)-12(4). The RF circuit 10 includes a plurality of RF front end modules (FEMs) 14(1)-14(4) coupled to the antennas 12(1)-12(4), respectively. The RF circuit 10 also includes antenna-swapping circuitry 16 that can be dynamically configured and/or controlled to select one or more of the antennas 12(1)-12(4) for transmitting an RF uplink signal(s) and/or receiving an RF downlink signal(s).

The RF circuit 10 includes a plurality of multiplexer circuitries 18(1)-18(4) configured to be coupled with the antennas 12(1)-12(4) to support such operation modes as carrier aggregation (CA) and/or multiple-input multiple-output (MIMO). For the convenience of illustration and discussion, the multiplexer circuitry 18(1) is shown herein as pentaplexer circuitry and the multiplexer circuitry 18(3) is shown herein as triplexer circuitry. The multiplexer circuitry 18(2) and the multiplexer circuitry 18(4) are not illustrated as particular types of multiplexers. However, it should be appreciated that the RF circuit 10 can include any number of multiplexer circuitries of any types (e.g., duplexer circuitry, triplexer circuitry, quadplexer circuitry, pentaplexer circuitry, etc.).

The multiplexer circuitry 18(1) includes a first transmit filter 20, a second transmit filter 22, a first receive filter 24, a second receive filter 26, and a third receive filter 28 that are coupled to a common node 30. The common node 30 is coupled to switching circuitry 32, which includes switches $S_1$, $S_2$, $S_3$, and so on. The switching circuitry 32 is coupled to the antenna-swapping circuitry 16. In this regard, the common node 30 can be coupled to any one or more of the antennas 12(1)-12(4) via the switching circuitry 32 and the antenna-swapping circuitry 16.

The multiplexer circuitry 18(3) (second multiplexer circuitry) includes a first diversity receive filter 34, a second diversity receive filter 36, and a third diversity receive filter 38 that are coupled to a second common node 40. The second common node 40 is coupled to second switching circuitry 42 and the second switching circuitry 42 is coupled to the antenna-swapping circuitry 16. Notably, the second common node 40 can be coupled to any one or more of the antennas 12(1)-12(4) via the second switching circuitry 42 and the antenna-swapping circuitry 16.

The RF circuit 10 includes control circuitry 44, which can be a microprocessor, a microcontroller, or a field-programmable gate array (FPGA) for example. The control circuitry 44 may be coupled to the multiplexer circuitries 18(1)-18(4), the switching circuitry 32, the second switching circuitry 42, and the antenna-swapping circuitry 16. Accordingly, the control circuitry 44 may dynamically configure the RF circuit 10 to support various band combinations.

For example, the first transmit filter 20 and the second transmit filter 22 are configured to pass an RF uplink signal 46 for transmission in a mid-band (MB) RF band (e.g., 1710-2200 MHz), such as long-term evolution (LTE) band one (LTE B1), band three (LTE B3), and band four (LTE B4), and/or a high-band (HB) RF band (e.g., 2300-2700 MHz), such as LTE band seven (LTE B7). The RF uplink signal 46 may be amplified by power amplifiers 48, 50 prior to being provided to the first transmit filter 20 and the second transmit filter 22. The first receive filter 24 and the second receive filter 26 may be configured to pass an RF downlink signal 52 in the MB RF band and/or the HB RF band. The third receive filter 28 may be configured to pass the RF downlink signal 52 in a low-band (LB) RF band (e.g., 450-960 MHz), such as LTE band twenty (LTE B20). In this regard, the RF circuit 10 is already capable of supporting the LB RF band, the MB RF band, and the HB RF band.

There is also a need for the RF circuit 10 to add support for a mid-low-band (MLB) RF band (e.g., 1452-1496 MHz) due to a new addition of LTE band thirty-two (LTE B32). According to the conventional band expansion method, a fourth receive filter 54 may be added to the multiplexer circuitry 18(1) to pass the RF downlink signal 52 in the MLB frequency band. However, providing the fourth receive filter 54 in close proximity to the first transmit filter 20, the second transmit filter 22, the first receive filter 24, and the second receive filter 26 may raise several issues that can compromise RF performance of the RF circuit 10.

If the fourth receive filter 54 is provided as a surface acoustic wave (SAW) filter, the fourth receive filter 54 may generate undesired frequency responses to the first receive filter 24 and the second receive filter 26 due to insufficient separation between the MLB RF band and the MB RF band. As a result, RF performance of the first receive filter 24 and the second receive filter 26 may be adversely impacted. If the fourth receive filter 54 is provided as a bulk acoustic wave (BAW) filter, however, physical dimension of the multiplexer circuitry 18(1) may be substantially increased, thus leading to an increased footprint of the RF circuit 10. In this regard, it may be desired to add support for the MLB RF band without compromising RF performance and increasing footprint of the RF circuit 10.

In this regard, FIG. 2 is a schematic diagram of an exemplary multi-band RF circuit 56 configured to support multiple RF bands based on a band expansion method different from the conventional band expansion method of FIG. 1. The multi-band RF circuit 56 includes at least one first antenna port 58, at least one second antenna port 60, at least one third antenna port 62, and at least one fourth antenna port 64. The first antenna port 58 is coupled to at least one first antenna 66, the second antenna port 60 is coupled to at least one second antenna 68, the third antenna port 62 is coupled to at least one third antenna 70, and the fourth antenna port 64 is coupled to at least one fourth antenna 72. Although the multi-band RF circuit 56 is shown herein with only four antenna ports and four antennas, it should be appreciated that the multi-band RF circuit 56 can include any suitable number of antenna ports and antennas.

Notably, the multi-band RF circuit 56 may be provided in a mobile device form factor. In a non-limiting example, to help mitigate potential hand-effect by a mobile device user, the first antenna 66 and the third antenna 70 can be provided on one end (e.g., bottom edge) of the mobile device form factor, and the second antenna 68 and the fourth antenna 72 can be provided on an opposing end (e.g., top edge) of the mobile device form factor.

Each of the first antenna 66, the second antenna 68, the third antenna 70, and the fourth antenna 72 is configured to transmit an RF uplink signal 74 and receive an RF downlink signal 76 in a first RF band, a second RF band, a third RF band, and a fourth RF band. In examples discussed herein, the first RF band refers to an LB RF band, which may include LTE B20. The second RF band refers to a MLB RF band, which may include LTE B32. The third RF band refers to an MB RF band, which may include LTE B1, LTE B3, and LTE B4. The fourth RF band refers to an HB RF band, which may include LTE B7.

The multi-band RF circuit 56 includes at least one first RF FEM 78, at least one second RF FEM 80, at least one third RF FEM 82, and at least one fourth RF FEM 84 coupled to the first antenna port 58, the second antenna port 60, the third antenna port 62, and the fourth antenna port 64, respectively. The multi-band RF circuit 56 includes antenna swapping circuitry 86. The antenna swapping circuitry 86 is coupled to the first antenna port 58, the second antenna port 60, the third antenna port 62, and the fourth antenna port 64 via the first RF FEM 78, the second RF FEM 80, the third RF FEM 82, and the fourth RF FEM 84, respectively.

The multi-band RF circuit 56 includes first multiplexer circuitry 88. The first multiplexer circuitry 88 includes a first transmit filter 90, a second transmit filter 92, a first primary receive filter 94, a second primary receive filter 96, and a third primary receive filter 98 that are coupled to a first common node 100. The first common node 100 is coupled to first switching circuitry 102, which includes switches $S_1$, $S_2$, $S_3$, and so on, and the first switching circuitry 102 is coupled to the antenna swapping circuitry 86. As such, the first multiplexer circuitry 88 may be coupled to any of the first antenna port 58, the second antenna port 60, the third antenna port 62, and the fourth antenna port 64. The first transmit filter 90 and the second transmit filter 92 may be configured to pass the RF uplink signal 74 in the third RF band and the fourth RF band. The first primary receive filter 94 and the second primary receive filter 96 may be configured to pass the RF downlink signal 76 in the third RF band and the fourth RF band. The third primary receive filter 98 may be configured to pass the RF downlink signal 76 in the first RF band.

The multi-band RF circuit 56 includes second multiplexer circuitry 104. The second multiplexer circuitry 104 includes a first secondary receive filter 106, a second secondary receive filter 108, and a third secondary receive filter 110 that are coupled to a second common node 112. The second common node 112 is coupled to second switching circuitry 114, which includes switches $S_1$, $S_2$, $S_3$, and so on, and the second switching circuitry 114 is coupled to the antenna swapping circuitry 86. As such, the second multiplexer circuitry 104 may be coupled to any of the first antenna port 58, the second antenna port 60, the third antenna port 62, and the fourth antenna port 64. The first secondary receive filter 106 and the second secondary receive filter 108 may be configured to pass the RF downlink signal 76 in the third RF band and the fourth RF band. The third secondary receive filter 110 may be configured to pass the RF downlink signal 76 in the first RF band.

The multi-band RF circuit 56 further includes third multiplexer circuitry 116 and fourth multiplexer circuitry 118. The third multiplexer circuitry 116 and the fourth multiplexer circuitry 118 may each include respective receive filters configured to pass the RF downlink signal 76 in specific RF bands and/or respective transmit filters configured to pass the RF uplink signal in specific RF bands. Both the third multiplexer circuitry 116 and the fourth multiplexer circuitry 118 are coupled to the antenna swapping circuitry 86 and, therefore, can be coupled to any of the first antenna port 58, the second antenna port 60, the third antenna port 62, and the fourth antenna port 64.

For the convenience of illustration and discussion, the first multiplexer circuitry 88 is shown herein as pentaplexer circuitry and the second multiplexer circuitry 104 is shown herein as triplexer circuitry. The third multiplexer circuitry 116 and the fourth multiplexer circuitry 118 are not illustrated as particular types of multiplexers. However, it should be appreciated that the multi-band RF circuit 56 can include any number of multiplexer circuitries of any types (e.g., duplexer circuitry, triplexer circuitry, quadplexer circuitry, pentaplexer circuitry, etc.).

The multi-band RF circuit 56 includes a first MLB receive filter 120 and a second MLB receive filter 122. Each of the first MLB receive filter 120 and the second MLB receive filter 122 is configured to pass the RF downlink signal 76 in the second RF band. The first MLB receive filter 120 and the second MLB receive filter 122 are coupled to the antenna swapping circuitry 86. As a result, the first MLB receive filter 120 and the second MLB receive filter 122 can each be coupled to any of the first antenna port 58, the second antenna port 60, the third antenna port 62, and the fourth antenna port 64.

As opposed to providing the first MLB receive filter 120 and/or the second MLB receive filter 122 in close proximity to other MB and/or HB receive filters (e.g., the first primary receive filter 94, the second primary receive filter 96, the first secondary receive filter 106, and the second secondary receive filter 108), the first MLB receive filter 120 and the second MLB receive filter 122 are provided in the multi-band RF circuit 56 as standalone filters. In this regard, the first MLB receive filter 120 and the second MLB receive filter 122 are not integrated with other filters in the multi-band RF circuit 56. As a result, the first MLB receive filter 120 and the second MLB receive filter 122 can be provided as SAW filters to help reduce the footprint of the multi-band RF circuit 56. Since the first MLB receive filter 120 and the second MLB receive filter 122 are not provided in close proximity to other MB receive filters, it is possible to avoid the undesired frequency response associated with the SAW filter. As a result, it is possible to configure the multi-band RF circuit 56 to support concurrently the first RF band, the second RF band, the third RF band, and the fourth RF band without compromising RF performance of the multi-band RF circuit 56.

The multi-band RF circuit 56 includes control circuitry 124, which can be a microprocessor, a microcontroller, or a field-programmable gate array (FPGA) for example. The control circuitry 124 is coupled to the antenna swapping circuitry 86. The control circuitry 124 may also be coupled to the first multiplexer circuitry 88, the second multiplexer circuitry 104, the third multiplexer circuitry 116, and the fourth multiplexer circuitry 118. Accordingly, the control circuitry 124 may dynamically configure the multi-band RF circuit 56 to support various band combinations in various operation modes such as CA and MIMO.

In one non-limiting example, the multi-band RF circuit 56 can be configured to receive the RF downlink signal 76 in the second band, while concurrently transmitting the RF uplink signal 74 and receiving the RF downlink signal 76 in the third RF band and the fourth RF band. In this regard, the control circuitry 124 may control the antenna swapping circuitry 86 to select one or more of the first antenna port 58 and the second antenna port to 60 receive the RF downlink signal 76 in the second RF band. Concurrently, the control circuitry 124 can control the antenna swapping circuitry 86 to select one or more of the third antenna port 62 and the fourth antenna port 64 to transmit the RF uplink signal 74 and receive the RF downlink signal 76 in the third RF band and the fourth RF band. For example, the control circuitry 124 can control the antenna swapping circuitry 86 to couple the first antenna port 58 to the first MLB receive filter 120 to receive the RF downlink signal 76 in the second RF band via the first antenna 66. Alternatively, the control circuitry 124 can control the antenna swapping circuitry 86 to couple the second antenna port 60 to the second MLB receive filter 122 to receive the RF downlink signal 76 in the second RF band via the second antenna 68. Further, the control circuitry 124 can control the antenna swapping circuitry 86 to couple the first antenna port 58 and the second antenna port 60 to the first MLB receive filter 120 and the second MLB receive filter 122, respectively, to receive the RF downlink signal 76 in the second RF band concurrently via the first antenna 66 and the second antenna 68. In this regard, the multi-band RF circuit 56 receives the RF downlink signal 76 in the second RF band in a dual-receive operation.

Concurrent to receiving the RF downlink signal 76 in the second RF band, the control circuitry 124 may control the antenna swapping circuitry 86 to couple the third antenna port 62 to the first multiplexer circuitry 88 to transmit the RF uplink signal 74 in the third RF band and the fourth RF band and to receive the RF downlink signal 76 in the third RF band and the fourth RF band via the third antenna 70. Alternatively, the control circuitry 124 may control the antenna swapping circuitry 86 to couple the fourth antenna port 64 to the first multiplexer circuitry 88 to transmit the RF uplink signal 74 in the third RF band and the fourth RF band and to receive the RF downlink signal 76 in the third RF band and the fourth RF band via the fourth antenna 72.

The control circuitry 124 may further configure the multi-band RF circuit 56 to receive the RF downlink signal 76 in the third RF band and the fourth RF band through multiple-input, single-output MISO operation. In this regard, the control circuitry 124 may control the antenna swapping circuitry 86 to couple the third antenna port 62 to the first multiplexer circuitry 88 to transmit the RF uplink signal 74 in the third RF band and the fourth RF band and to receive the RF downlink signal 76 in the third RF band and the fourth RF band via the third antenna 70, while concurrently controlling the antenna swapping circuitry 86 to couple the fourth antenna port 64 to the second multiplexer circuitry 104 to receive the RF downlink signal 76 in the third RF band and the fourth RF band via the fourth antenna 72.

Alternatively, the control circuitry 124 may control the antenna swapping circuitry 86 to couple the fourth antenna port 64 to the first multiplexer circuitry 88 to transmit the RF uplink signal 74 in the third RF band and the fourth RF band and to receive the RF downlink signal 76 in the third RF band and the fourth RF band via the fourth antenna 72, while concurrently controlling the antenna swapping circuitry 86 to couple the third antenna port 62 to the second multiplexer circuitry 104 to receive the RF downlink signal 76 in the third RF band and the fourth RF band via the third antenna 70.

In another non-limiting example, the third primary receive filter 98 in the first multiplexer circuitry 88 and the third secondary receive filter 110 in the second multiplexer circuitry 104 may be configured to function as a first LB receive filter and a second LB receive filter, respectively, to pass the RF downlink signal 76 in the first RF band. In this regard, the control circuitry 124 can further control the antenna swapping circuitry 86 to couple the third primary receive filter 98 and the third secondary receive filter 110 to the first antenna port 58 and the second antenna port 60, respectively, to receive the RF downlink signal 76 in the first RF band concurrently to receiving the RF downlink signal 76 in the second RF band. Notably, it may be possible to provide the first LB receiver filter and the second LB receive filter as standalone filters. Given that there may be sufficient separation between the first RF band and the second RF band, it may also be possible to integrate the first LB receiver filter and the second LB receive filter with the first MLB receive filter 120 and the second MLB receive filter 122, respectively.

The multi-band RF circuit 56 may be configured to support the multiple RF bands according to an alternative configuration. In this regard, FIG. 3 is a schematic diagram of an exemplary multi-band RF circuit 56A configured to support multiple RF bands based on a configuration method different from the band expansion method of FIG. 2. Common elements between FIGS. 2 and 3 are shown therein with common element numbers and will not be re-described herein.

In the multi-band RF circuit 56A, the control circuitry 124 may control the antenna swapping circuitry 86 to couple the first antenna port 58 to the first multiplexer circuitry 88 to transmit the RF uplink signal 74 in the third RF band and the fourth RF band and to receive the RF downlink signal 76 in the third RF band and the fourth RF band via the first antenna 66. The control circuitry 124 may also control the antenna swapping circuitry 86 to couple the second antenna port 60 to the second multiplexer circuitry 104 to receive the RF downlink signal 76 concurrently in the third RF band and the fourth RF band via the second antenna 68. In addition, the control circuitry 124 may control the antenna swapping circuitry 86 to couple the third antenna port 62 and the fourth antenna port 64 to the first MLB receive filter 120 and the second MLB receive filter 122, respectively, to receive the RF downlink signal 76 concurrently in the second RF band via the third antenna 70 and the fourth antenna 72.

The multi-band RF circuit 56A may include at least one first LB receive filter 126 and at least one second LB receive filter 128. In this regard, the control circuitry 124 may control the antenna swapping circuitry 86 to couple the first LB receive filter 126 and the second LB receive filter 128 to the first antenna port 58 and the second antenna port 60, respectively, to receive the RF downlink signal 76 concurrently in the first RF band via the first antenna 66 and the second antenna 68.

Those skilled in the art will recognize improvements and modifications to the preferred embodiments of the present disclosure. All such improvements and modifications are considered within the scope of the concepts disclosed herein and the claims that follow.

What is claimed is:

1. A multi-band radio frequency (RF) circuit comprising:
   antenna swapping circuitry coupled to at least one first antenna port coupled to at least one first antenna, at least one second antenna port coupled to at least one second antenna, at least one third antenna port coupled to at least one third antenna, and at least one fourth antenna port coupled to at least one fourth antenna, wherein each of the at least one first antenna, the at least one second antenna, the at least one third antenna, and the at least one fourth antenna is configured to transmit an RF uplink signal and receive an RF downlink signal in a first RF band having a first frequency spectrum, a second RF band having a second frequency spectrum higher than the first frequency spectrum, a third RF band having a third frequency spectrum higher than the second frequency spectrum, and a fourth RF band having a fourth frequency spectrum higher than the third frequency spectrum; and
   control circuitry coupled to the antenna swapping circuitry and configured to:
     control the antenna swapping circuitry to select one or more of the at least one first antenna port and the at least one second antenna port to receive the RF downlink signal in the second RF band; and
     control the antenna swapping circuitry to select one or more of the at least one third antenna port and the at least one fourth antenna port to transmit the RF uplink signal and receive the RF downlink signal in the third RF band and the fourth RF band.

2. The multi-band RF circuit of claim 1 further comprising a first mid-low-band (MLB) receive filter and a second MLB receive filter each coupled to the antenna swapping circuitry and each configured to pass the RF downlink signal in the second RF band.

3. The multi-band RF circuit of claim 2 wherein the first MLB receive filter and the second MLB receive filter are each provided as a standalone filter not integrated with any other filter.

4. The multi-band RF circuit of claim 2 wherein the control circuitry is further configured to control the antenna swapping circuitry to couple the at least one first antenna port to the first MLB receive filter to receive the RF downlink signal in the second RF band.

5. The multi-band RF circuit of claim 2 wherein the control circuitry is further configured to control the antenna swapping circuitry to couple the at least one second antenna port to the second MLB receive filter to receive the RF downlink signal in the second RF band.

6. The multi-band RF circuit of claim 2 wherein the control circuitry is further configured to control the antenna swapping circuitry to couple the at least one first antenna port and the at least one second antenna port to the first MLB receive filter and the second MLB receive filter, respectively, to receive the RF downlink signal in the second RF band concurrently.

7. The multi-band RF circuit of claim 2 further comprising:
   first multiplexer circuitry comprising:
     at least one transmit filter coupled to the antenna swapping circuitry and configured to pass the RF uplink signal in the third RF band and the fourth RF band; and
     at least one primary receive filter coupled to the antenna swapping circuitry and configured to pass the RF downlink signal in the third RF band and the fourth RF band; and second multiplexer circuitry comprising at least one secondary receive filter coupled to the antenna swapping circuitry and configured to pass the RF downlink signal in the third RF band and the fourth RF band.

8. The multi-band RF circuit of claim 7 wherein the control circuitry is further configured to control the antenna swapping circuitry to couple the at least one third antenna port to the first multiplexer circuitry to transmit the RF uplink signal in the third RF band and the fourth RF band and to receive the RF downlink signal in the third RF band and the fourth RF band.

9. The multi-band RF circuit of claim 7 wherein the control circuitry is further configured to:
control the antenna swapping circuitry to couple the at least one third antenna port to the first multiplexer circuitry to transmit the RF uplink signal in the third RF band and the fourth RF band and to receive the RF downlink signal in the third RF band and the fourth RF band via the at least one third antenna; and
control the antenna swapping circuitry to couple the at least one fourth antenna port to the second multiplexer circuitry to receive concurrently the RF downlink signal in the third RF band and the fourth RF band via the at least one fourth antenna.

10. The multi-band RF circuit of claim 7 wherein the control circuitry is further configured to control the antenna swapping circuitry to couple the at least one fourth antenna port to the first multiplexer circuitry to transmit the RF uplink signal in the third RF band and the fourth RF band and to receive the RF downlink signal in the third RF band and the fourth RF band.

11. The multi-band RF circuit of claim 7 wherein the control circuitry is further configured to:
control the antenna swapping circuitry to couple the at least one fourth antenna port to the first multiplexer circuitry to transmit the RF uplink signal in the third RF band and the fourth RF band and to receive the RF downlink signal in the third RF band and the fourth RF band via the at least one fourth antenna; and
control the antenna swapping circuitry to couple the at least one third antenna port to the second multiplexer circuitry to receive concurrently the RF downlink signal in the third RF band and the fourth RF band via the at least one third antenna.

12. The multi-band RF circuit of claim 7 further comprising:
at least one first low-band (LB) receive filter coupled to the antenna swapping circuitry and configured to pass the RF downlink signal in the third RF band and the fourth RF band; and
at least one second LB receive filter coupled to the antenna swapping circuitry and configured to pass the RF downlink signal in the third RF band and the fourth RF band.

13. The multi-band RF circuit of claim 12 wherein the at least one first LB receive filter and the at least one second LB receive filter are integrated into the first multiplexer circuitry and the second multiplexer circuitry, respectively.

14. The multi-band RF circuit of claim 12 wherein the control circuitry is further configured to control the antenna swapping circuitry to couple the at least one first LB receive filter and the at least one second LB receive filter to the at least one first antenna port and the at least one second antenna port, respectively, to receive the RF downlink signal in the first RF band concurrently to receiving the RF downlink signal in the second RF band.

15. The multi-band RF circuit of claim 12 wherein the control circuitry is further configured to:
control the antenna swapping circuitry to couple the at least one first antenna port to the first multiplexer circuitry to transmit the RF uplink signal in the third RF band and the fourth RF band and to receive the RF downlink signal in the third RF band and the fourth RF band; and
control the antenna swapping circuitry to couple the at least one second antenna port to the second multiplexer circuitry to receive the RF downlink signal concurrently in the third RF band and the fourth RF band.

16. The multi-band RF circuit of claim 15 wherein the control circuitry is further configured to control the antenna swapping circuitry to couple the at least one third antenna port and the at least one fourth antenna port to the first MLB receive filter and the second MLB receive filter, respectively, to receive the RF downlink signal concurrently in the second RF band.

17. The multi-band RF circuit of claim 16 wherein the control circuitry is further configured to control the antenna swapping circuitry to couple the at least one first LB receive filter and the at least one second LB receive filter to the at least one first antenna port and the at least one second antenna port, respectively, to receive the RF downlink signal concurrently in the first RF band.

18. The multi-band RF circuit of claim 1 is provided in a mobile device form factor.

19. The multi-band RF circuit of claim 18 wherein:
the at least one first antenna port and the at least one second antenna port are provided on opposing ends of the mobile device form factor; and
the at least one third antenna port and the at least one fourth antenna port are provided on opposing ends of the mobile device form factor.

20. The multi-band RF circuit of claim 1 wherein:
the first RF band comprises long-term evolution (LTE) band twenty;
the second RF band comprises LTE band thirty-two;
the third RF band comprises an LTE band selected from the group consisting of: LTE band one; LTE band three; and LTE band four; and
the fourth RF band comprises LTE band seven.

* * * * *